US009239383B2

(12) United States Patent
Jin

(10) Patent No.: US 9,239,383 B2
(45) Date of Patent: Jan. 19, 2016

(54) WIDE BEAM SAR FOCUSING METHOD USING NAVIGATION SOLUTION DERIVED FROM AUTOFOCUS DATA

(75) Inventor: Michael Yih-Hwa Jin, Arcadia, CA (US)

(73) Assignee: RAYTHEON COMPANY, Waltham, MA (US)

( * ) Notice: Subject to any disclaimer, the term of this patent is extended or adjusted under 35 U.S.C. 154(b) by 729 days.

(21) Appl. No.: 13/536,731

(22) Filed: Jun. 28, 2012

(65) Prior Publication Data

US 2015/0061927 A1    Mar. 5, 2015

(51) Int. Cl.
  *G01S 13/90* (2006.01)
  *G01C 21/00* (2006.01)
  *G01S 13/00* (2006.01)

(52) U.S. Cl.
  CPC ............ *G01S 13/9035* (2013.01); *G01C 21/00* (2013.01); *G01S 13/90* (2013.01)

(58) Field of Classification Search
  CPC ....... G01S 13/88; G01S 13/885; G01S 13/89; G01S 13/90; G01S 13/9011; G01S 13/9017; G01S 13/9035; G01S 2013/9052; G01C 21/00; G01C 21/20
  USPC .......... 342/21, 22, 25 R–25 F, 175, 176, 179, 342/192–197, 61–67, 165, 173, 174; 382/254, 255, 260–265, 275, 276
  See application file for complete search history.

(56) References Cited

U.S. PATENT DOCUMENTS

| 4,851,848 | A | * | 7/1989 | Wehner | 342/25 D |
| 4,853,699 | A | * | 8/1989 | Easton | 342/25 C |
| 4,929,950 | A | * | 5/1990 | Freeman et al. | 342/25 D |
| 4,999,635 | A | * | 3/1991 | Niho | 342/25 D |
| 5,021,789 | A | * | 6/1991 | Shaw | 342/25 E |
| 5,432,520 | A | * | 7/1995 | Schneider et al. | 342/25 F |
| 5,440,309 | A | * | 8/1995 | Moreira et al. | 342/25 A |
| 5,485,384 | A | * | 1/1996 | Falconnet | 342/25 A |
| 5,937,102 | A | * | 8/1999 | Jin | 382/276 |
| 6,037,892 | A | * | 3/2000 | Nikias et al. | 342/25 F |
| 6,046,695 | A | * | 4/2000 | Poehler et al. | 342/25 A |
| 6,492,932 | B1 | * | 12/2002 | Jin et al. | 342/25 R |

(Continued)

OTHER PUBLICATIONS

U.S. Appl. No. 13/347,548, filed Jan. 10, 2012, inventor Michael Y. Jin, 38 pages.

(Continued)

*Primary Examiner* — Bernarr Gregory
(74) *Attorney, Agent, or Firm* — Christie, Parker & Hale, LLP

(57) ABSTRACT

An algorithm for deriving improved navigation data from the autofocus results obtained from selected image blocks in a wide-beam synthetic aperture radar (SAR) image. In one embodiment the navigation error may be approximated with a vector of low-order polynomials, and a set of polynomial coefficients found which results in a good phase error match with the autofocus results. In another embodiment, a least squares solution may be found for the system of equations relating the phase errors at a point in time for selected image blocks to the navigation error vector at that point in time. An approach using low sample rate backprojection (150) initially to select suitable image blocks, and full sample rate backprojection (156) for the selected image blocks, followed by full sample rate backprojection (164) for the image, using the improved navigation solution, may be used to reduce the computational load of employing the algorithm.

10 Claims, 4 Drawing Sheets

(56) References Cited

U.S. PATENT DOCUMENTS

| | | | |
|---|---|---|---|
| 6,628,844 B1* | 9/2003 | Benitz | 382/276 |
| 6,738,009 B1* | 5/2004 | Tsunoda | 342/25 A |
| 6,781,541 B1* | 8/2004 | Cho | 342/25 D |
| 6,911,933 B1* | 6/2005 | Mutz et al. | 342/25 B |
| 7,145,496 B2 | 12/2006 | Cho et al. | |
| 7,277,042 B1* | 10/2007 | Cho et al. | 342/25 F |
| 7,551,119 B1* | 6/2009 | Doerry | 342/25 R |
| 7,663,529 B2 | 2/2010 | Connell et al. | |
| 8,115,666 B2* | 2/2012 | Moussally et al. | 342/22 |
| 8,564,473 B2* | 10/2013 | Bosser et al. | 342/25 F |
| 8,569,669 B2* | 10/2013 | Holicki et al. | 342/195 |
| 2010/0086228 A1* | 4/2010 | Cho et al. | 382/255 |

OTHER PUBLICATIONS

Cantalloube, et al., Multiscale Local Map-Drift-Driven Multilateration SAR Autofocus Using Fast Polar Format Image Synthesis, IEEE Transactions on Geoscience and Remote Sensing, IEEE Service Center, Piscataway, NJ, vol. 49, No. 10 Oct. 1, 2011 (pp. 3730-3736).

Cantalloube, et al., "Airborne X-band SAR Imaging With 10 cm Resolution: Technical Challenge and Preliminary Results", IEE Proceedings: Radar, Sonar & Navigation, Institution of Electrical Engineers, GB, vol. 153, No. 2, Apr. 13, 2006 (pp. 163-176).

Sjanic et al., "Navigation and SAR Auto-Focusing Based on the Phase Gradient Approach", Information Fusion (Fusion), 2011 Proceedings of the 14th International Conference on, IEEE, Jul. 5, 2011 (pp. 1-8).

Xing, et al., "Motion Compensation for UAV SAR Based on Raw Radar Data", IEEE Transactions on Geoscience and Remote Sensing, IEEE Service Center, Piscataway, NJ, vol. 47, No. 8, Aug. 1, 2009 (pp. 2870-2883).

Zhang, et al., "A Robust Motion Compensation Approach for UAV SAR Imagery", IEEE Transactions on Geoscience and Remote Sensing, IEEE Service Center, Piscataway, NJ, vol. 50, No. 8 Feb. 3, 2012 (pp. 3202-3218).

Written Opinion of the International Searching Authority for International Application No. PCT/US2013/036466, filed Apr. 12, 2013, Written Opinion of the International Searching Authority mailed Jan. 21, 2014 (8 pgs.).

International Search Report for International Application No. PCT/US2013/036466, filed Apr. 12, 2013, International Search Report dated Jan. 15, 2014 and mailed Jan. 21, 2014 (3 pgs.).

International Preliminary Report on Patentability from corresponding International Application No. PCT/US2013/036466, International Preliminary Report on Patentability dated Dec. 31, 2014 and mailed Jan. 8, 2015 (10 pgs.).

* cited by examiner

WIDE BEAM SAR FOCUSING METHOD USING NAVIGATION SOLUTION DERIVED FROM AUTOFOCUS DATA

STATEMENT REGARDING FEDERALLY SPONSORED RESEARCH OR DEVELOPMENT

This invention was made with U.S. Government support under contract No. H94003-04-D-0006 awarded by the Department of Defense. The U.S. Government has certain rights in this invention.

CROSS-REFERENCE TO RELATED APPLICATION(S)

This application is related to and incorporates by reference in its entirety, as if set forth in full, U.S. patent application Ser. No. 13/347,548, filed on Jan. 10, 2012 ("the '548 application"), now U.S. Pat. No. 9,041,585.

BACKGROUND

1. Field

One or more aspects of embodiments according to the present invention relate to improving the quality of synthetic aperture radar images and more particularly to methods for generating navigation profiles resulting in improved image quality.

2. Description of Related Art

Ground penetration radar (GPR) typically operates at low frequency because higher frequencies have a significantly diminished ability to penetrate the ground. When operated from a platform, such as an aircraft, capable of carrying only a small antenna, the low frequency, i.e., long wavelength, results in a wide antenna pattern.

The use of synthetic aperture radar (SAR) makes it possible to generate radar images with high spatial resolution using a small antenna on a moving platform. SAR signal processing techniques accomplish this by combining the signals received by the moving antenna at various points along its path in such a way as to simulate the operation of a larger antenna, having dimensions comparable to those of the path of the small antenna.

To construct sharp SAR images it is necessary to have more accurate information about the path of the antenna than may be available, for example, from a path estimator based on a global positioning system receiver and on an inertial navigation system (a GPS/INS system). Prior art systems may generate improved images using an autofocus algorithm after first dividing the image into sub-images, or image blocks, and then finding values of the second order range corrections for which the focus is best. These systems may, if large image blocks are used, suffer from discontinuities at the boundaries between image blocks. If small image blocks are used, then some may contain low quality targets and the results of the autofocus algorithm may be poor.

Therefore, there is a need for a new solution to refocus SAR images.

SUMMARY

Embodiments of the present invention provide methods for processing SAR and navigation data to produce images of improved quality. In particular, the present invention provides methods for generating navigation profiles resulting in improved SAR images. Embodiments of the present invention also provide the particular benefit of generating navigation profiles resulting in SAR images with reduced discontinuities at the boundaries between image blocks in the images.

According to an embodiment of the present invention there is provided a method for forming a synthetic aperture radar (SAR) image, from SAR data and a navigation profile, the method comprising: generating a first SAR image from the SAR data and the navigation profile; dividing the SAR image into image blocks; selecting a subset of the image blocks; applying an autofocus algorithm to each image block to form a phase error profile estimate for the image block; generating a navigation error profile estimate from the phase error profile estimates; and generating a second SAR image from the SAR data, the navigation profile, and the navigation error profile estimate.

In one embodiment, the generating a navigation error profile estimate comprises: approximating the navigation error profile estimate as a vector of three low-order polynomials in time and searching the space of polynomial coefficient values for a set of values which optimizes a measure of performance for the navigation error profile estimate.

In one embodiment, the measure of performance is the weighted summed norm of the phase error, taken over a set of selected image blocks.

In one embodiment, an image block is selected on the basis of having image contrast exceeding a predetermined threshold.

In one embodiment, the weight, for a selected image block, used in calculating the weighted summed norm of the phase error, equals (i) the reciprocal of the square root of the image contrast before autofocus for that image block, multiplied by (ii) the ratio of (a) the image contrast before autofocus for that image block to (b) the image contrast after autofocus for that image block.

In one embodiment, the generating a navigation error profile estimate comprises: selecting a set of image blocks; and finding, for each point in time, the point in space which minimizes the weighted sum of the squares of the differences between the phase errors for the selected image blocks calculated from the navigation error profile, and the phase errors for the selected image blocks resulting from the autofocus algorithm.

In one embodiment, the selected image blocks are selected on the basis of having image contrast exceeding a predetermined threshold.

In one embodiment, the weight, for a selected image block, used in calculating the weighted sum, is a function of the image contrast before autofocus for that image block and the image contrast after autofocus for that image block.

In one embodiment, the weight, for a selected image block, used in calculating the weighted sum, equals (i) the reciprocal of the square root of the image contrast before autofocus for that image block, multiplied by (ii) the ratio of (a) the image contrast before autofocus for that image block to (b) the image contrast after autofocus for that image block.

In one embodiment, the generating a navigation error profile estimate comprises: writing an intermediate navigation error profile estimate as a vector of three low-order polynomials in time; searching the space of polynomial coefficient values for a set of values which optimizes a measure of performance for the intermediate navigation error profile estimate; forming an intermediate navigation profile and an intermediate image block phase error profile using the set of values of the polynomial coefficients; selecting a set of image blocks; and using the intermediate navigation profile and the intermediate image block phase error profile to find, for each point in time, the point in space which minimizes the weighted sum of the squares of the differences between the phase errors for the selected image blocks calculated from the point in space, and the phase errors for the selected image blocks resulting from the autofocus algorithm.

According to an embodiment of the present invention there is provided a method for forming an improved navigation profile from a coarse navigation profile and from a synthetic aperture radar (SAR) image, the method comprising: generating a first SAR image from the SAR data and the navigation profile; dividing the SAR image into image blocks; selecting a subset of the image blocks; applying an autofocus algorithm to each image block to form a phase error profile estimate for the image block; and generating an improved navigation profile from the coarse navigation profile and the phase error profile estimates.

In one embodiment, the generating an improved navigation profile comprises: approximating a navigation error profile estimate as a vector of three low-order polynomials in time; searching the space of polynomial coefficient values for a set of values which optimizes a measure of performance for the navigation error profile estimate; and correcting the coarse navigation profile using the navigation error profile estimate.

In one embodiment, the measure of performance is the weighted summed norm of the phase error, taken over a set of selected image blocks.

In one embodiment, an image block is selected on the basis of having image contrast exceeding a predetermined threshold.

In one embodiment, the weight, for a selected image block, used in calculating the weighted summed norm of the phase error, is a function of the image contrast before autofocus for that image block and the image contrast after autofocus for that image block.

In one embodiment, the weight, for a selected image block, used in calculating the weighted summed norm of the phase error, equals (i) the reciprocal of the square root of the image contrast before autofocus for that image block, multiplied by (ii) the ratio of (a) the image contrast before autofocus for that image block to (b) the image contrast after autofocus for that image block.

In one embodiment, the generating an improved navigation profile comprises: selecting a set of image blocks; and finding, for each point in time, the point in space which minimizes the weighted sum of the squares of the differences between the phase errors for the selected image blocks calculated from the point in space, and the phase errors for the selected image blocks resulting from the autofocus algorithm.

In one embodiment, an image block is selected on the basis of having image contrast exceeding a predetermined threshold.

In one embodiment, the weight for an image block in the weighted sum, equals (i) the reciprocal of the square root of the image contrast before autofocus for that image block, multiplied by (ii) the ratio of (a) the image contrast before autofocus for that image block to (b) the image contrast after autofocus for that image block.

In one embodiment, the generating an improved navigation profile from the coarse navigation profile and the phase error profile estimates comprises: approximating an intermediate navigation error profile estimate as a vector of three low-order polynomials in time; searching the space of polynomial coefficient values for a set of values which optimizes a measure of performance for the intermediate navigation error profile estimate; forming an intermediate navigation profile and an intermediate image block phase error profile using the set of values of the polynomial coefficients; selecting a set of image blocks; and using the intermediate navigation profile and the intermediate image block phase error profile to find, for each point in time, the point in space which minimizes the weighted sum of the squares of the differences between the phase errors for the selected image blocks calculated from the point in space, and the phase errors for the selected image blocks resulting from the autofocus algorithm.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of the presently preferred embodiments, of a wide beam SAR focusing method using a navigation solution derived from autofocus data, provided in accordance with the present invention, and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
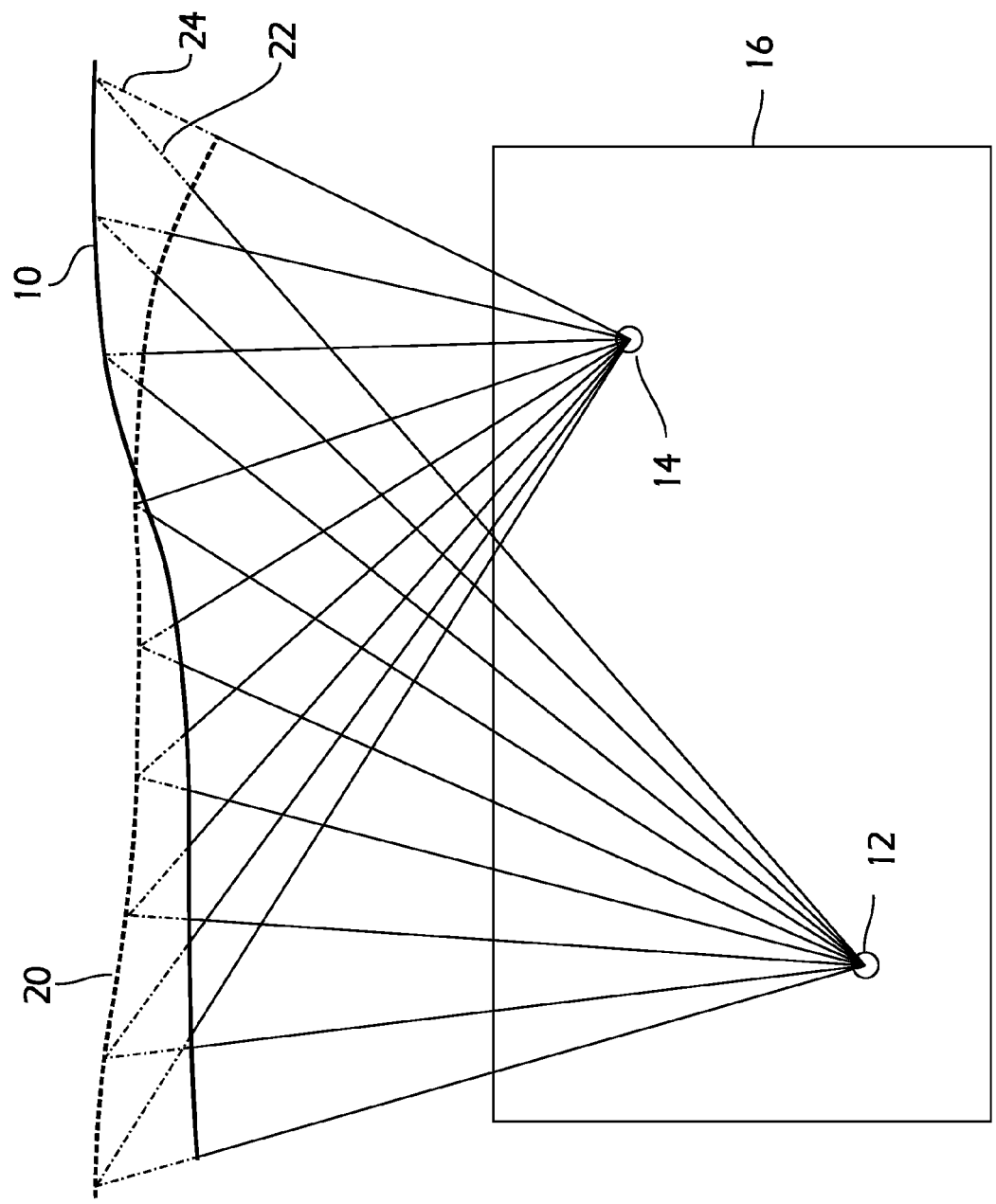
FIG. 1 is an illustration of an aircraft's actual and estimated path in relation to an area being imaged using SAR imaging.

In a wide beam SAR system, image defocusing varies spatially across the image because target range error is angle dependent. Referring to FIG. 1, an aircraft (not shown) flying along a path known as the actual aircraft path 10 may illuminate a first target 12 and a second target 14 in an image frame 16. A sensing system aboard the aircraft, such as a global positioning system combined with inertial sensors (GPS-INS), may form an estimate of the actual aircraft path 10; this estimate may be known as the navigation profile, or the knowledge aircraft path 20. The target phase profile for each target is determined by the range between that target and the actual aircraft path 10. Error in the knowledge aircraft path 20, i.e., any discrepancy between the knowledge aircraft path 20 and the actual aircraft path 10, leads to a range error 22 to the first target 12, and a range error 24 to the second target 14, at any point in time. The corresponding phase error as a function of time for any target is known as the phase error profile for that target. This error may yield a defocused image. In a wide beam SAR, the significant angle between targets, as seen from the aircraft position, results in their phase error profiles being different. Therefore, if two targets such as the first target 12 and the second target 14 are widely separated in angle, it may not be possible to refocus them using the same phase error profile.

One prior art solution to this angle dependent focusing problem involves dividing the image frame into multiple smaller image blocks, targets within which are sufficiently close together that they subtend relatively small angles at the aircraft. In one embodiment, sixteen such image blocks may be used. Independent autofocus solutions are derived from these image blocks. This approach has been found useful for images with modest to medium defocus. For images with a higher degree of defocus, the image resulting from performing the autofocus process on each image block often reveals image discontinuities at the boundaries between image blocks. Such discontinuities in an image may affect the performance of subsequent image exploitation processes such as automated target recognition (ATR) and change detection (CD).

The above-mentioned image discontinuity may be caused by the combined effect of two factors; the image block size and the target quality within the image block. A larger image block often leads to a more accurate phase error estimate because there is a higher probability that a larger image block contains point-like targets with enough strength for an autofocus algorithm to produce an accurate phase error profile. However, a larger image block is associated with a coarse quantization of the phase error that often leads to image discontinuity. On the other hand, a small image block is associated with a fine quantization of the phase error, but it often leads to poor phase error estimates due to a lower probability of containing quality targets.

An autofocus algorithm, such as that disclosed in the '548 application, may be used to extract the phase error profile of a defocused point-like target in a SAR image from the complex data corresponding to the target. This phase error profile consists of high order polynomial terms from the second order and above. Theoretically, the zeroth order phase error is related to the target range location error. The first order term is related to target azimuth location error. In a processed SAR image, there is no way to identify the location error without the use of the ground truth. An autofocus process may be used only to sharpen the target impulse response; it does not change the locations of the image pixels.

In one embodiment of the present invention, an improved navigation profile, or, equivalently, an estimate of the navigation error profile, is formed using phase error profiles obtained from an autofocus process. The SAR data is then reprocessed with this improved navigation profile to generate a well focused image free of image discontinuities. It is useful to note that the navigation profile is improved in the sense that it results in superior SAR images, and not necessarily in any other sense. Because the quality of the SAR image depends only on phase errors of certain orders, and is insensitive to others, the maximum discrepancy between the actual and estimated aircraft paths need not be reduced with the improvement; indeed, it may be increased.

Let the knowledge aircraft path be $\vec{R}_{AC}(t) = [x_{AC}(t)\ y_{AC}(t)\ z_{AC}(t)]^T$, and the image block center positions be $\vec{P}_{IM}(i,j) = [x_{IM}(i,j)\ y_{IM}(i,j)\ z_{IM}(i,j)]^T$. It is customary, although not necessary, to define the coordinate system with the x-axis tangential to the aircraft's velocity at some reference point along its path, such as the center of the track along which SAR data are taken, or at the beginning of that track. The z-axis is then chosen to be vertical, and y-axis is chosen to be perpendicular to both the x-axis and the z-axis, i.e., the y-axis is in the cross-track direction at the reference point.

Let the navigation error profile be $\overline{\Delta R}_{AC}(t)$. The phase error profile $\epsilon\theta_{i,j}(t)$ for a target located at the center of the $(i,j)^{th}$ image block is related to the navigation error profile $\overline{\Delta R}_{AC}(t)$ by $$\epsilon\theta_{i,j}(t) = \frac{4\pi}{\lambda}\left[\left\|\vec{R}_{AC}(t) - \vec{P}_{IM}(i,j)\right\| - \left\|(\vec{R}_{AC}(t) - \Delta\vec{R}_{AC}(t)) - \vec{P}_{IM}(i,j)\right\|\right],$$

where $\lambda$ is the wavelength of the radar radiation. Only the second and higher order terms of $\epsilon\theta_{i,j}(t)$ affect image focus. We denote $\epsilon\theta'_{i,j}(t)$ as this high order part of the phase error profile $\epsilon\theta_{i,j}(t)$, i.e., the phase error profile with its zeroth and first order terms removed.

We seek a navigation error profile resulting in phase error profiles for the image blocks which are in good agreement with the phase error profiles, $\epsilon\psi_{i,j}(t)$, obtained from the autofocus process. The extent to which such agreement exists may be quantified by the summed norm of the phase error, defined as $$\sum_{i,j}^{I,J} W_{i,j}\|\epsilon\psi_{i,j}(t) - \epsilon\theta'_{i,j}(t)\|$$

where the $W_{i,j}$ are suitably chosen weights, and I and J are the dimensions of the image in units of image blocks. Generally, the lower the summed norm of the phase error, the better the quality of the SAR image generated using the corresponding navigation error profile will be.

The summed norm of the phase error may be minimized by approximating the navigation error profile as a vector of low-order polynomials, and searching the space of polynomial coefficient values. These values may also be known as levels. In one embodiment, the polynomial approximation for the navigation error may be $$\overline{\Delta R}_{AC}(t) = \begin{bmatrix} \Delta x(t) \\ \Delta y(t) \\ \Delta z(t) \end{bmatrix} = \begin{bmatrix} a_1 t' + a_2 t'^2 + a_2 t'^3 \\ a_4 t'^2 + a_5 t'^3 \\ a_6 t'^2 + a_7 t'^3 \end{bmatrix},$$

where $$t' = t - \frac{T}{2},$$

and T is the synthetic aperture time.

i.e., the search may be conducted over a range of first, second, and third order errors in $\Delta x$, second and third order errors in $\Delta y$, and second and third order errors in $\Delta z$.

Figure 2:
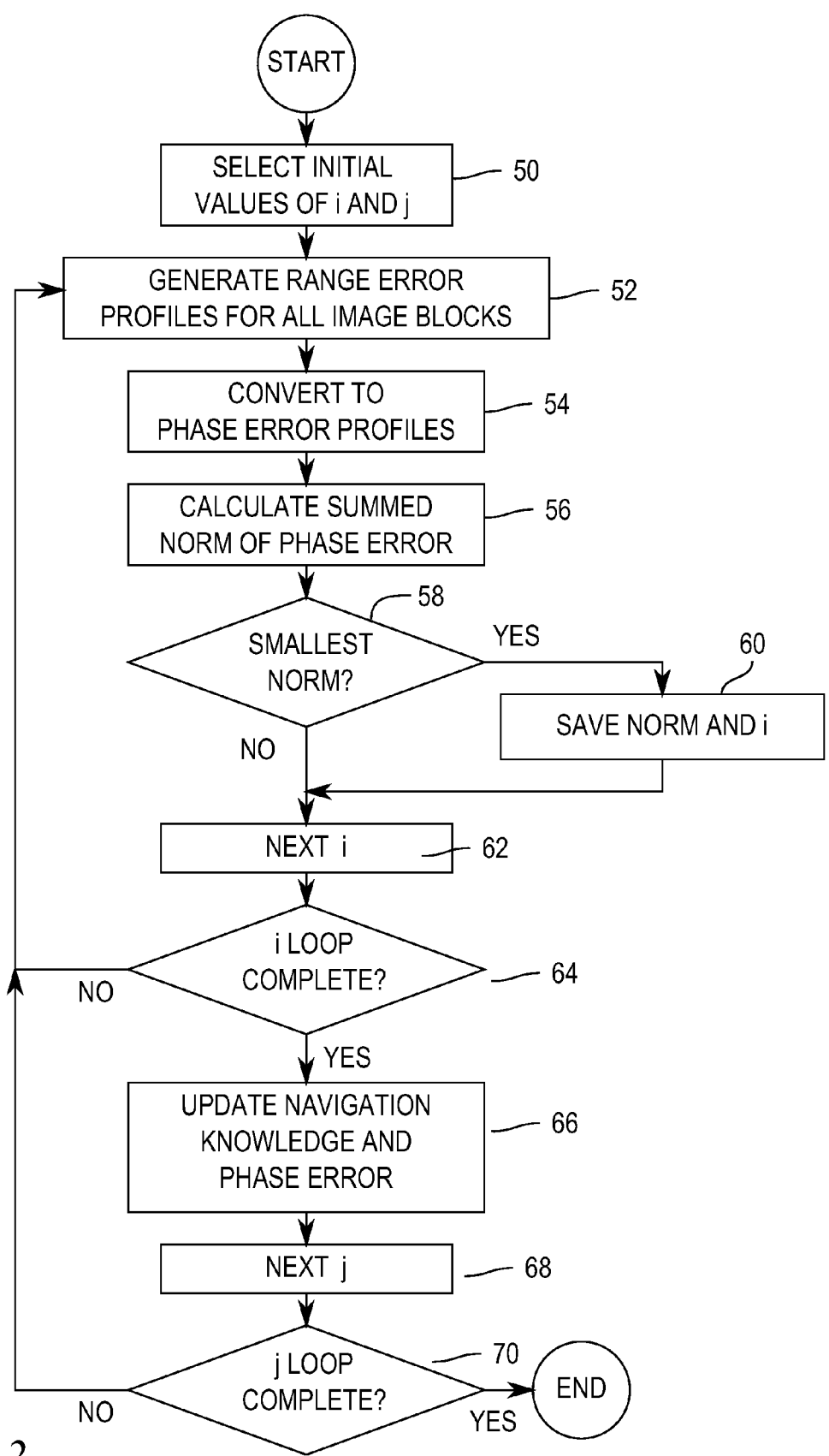
FIG. 2 is a flowchart of a method for producing an improved navigation profile according to an embodiment of the present invention.

Referring to FIG. 2, the search for the optimal set of coefficients $a_1, a_2, \ldots a_7$ may be done for one coefficient at a time, identified in FIG. 2 by the index j. For each coefficient a range of values may be tested, indexed by i; this range may be the pulling range for that coefficient, i.e., the range of values the coefficient may reasonably take, given the typical characteristics of the navigation error profile. For each trial point in the space of coefficient values, the summed norm of the phase error may be compared to the lowest previously obtained, and if it represents an improvement, the new lowest value may be stored along with the index i, or, equivalently, along with the corresponding value of the polynomial coefficient being tested.

In particular, an exemplary method may begin by setting, in step 50, initial values of the search indices i and j. Here, i may index different levels or values of the coefficient being optimized in an inner loop, and j may select which coefficient is optimized in the inner loop. For example, j=1 may correspond to optimizing $a_1$, j=2 may correspond to optimizing $a_2$, and so on. In a subsequent step 52, a range error profile may be generated for each image block. In step 54, the set of range error profiles may be converted to a set of phase error profiles. Steps 52 and 54 may be omitted for any image block for which the weight $W_{i,j}$ is zero. In step 56, the summed norm of the phase error may be calculated, and if, as determined by step 58, it is better, i.e., lower, than the best obtained so far, it may, in conditionally executed step 60, be saved, along with the index i which identifies the value resulting in the current best summed norm of the phase error. In an alternate embodiment, the coefficient value may be saved, instead of its index i. In steps 62 and 64, the index i is advanced and execution returns to the start of the loop, unless all values of i have been tested, in which case the outer loop index is advanced in step 68. Outer loop completion is tested in step 70; the outer loop repeats until all desired values of its index, j, have been tested.

Once optimal values, i.e., values which optimize the summed norm of the phase error, have been found for all seven coefficients, over the given pulling ranges, an improved navigation profile may be formed as $\vec{R}_{AC}(t) - \overline{\Delta R}_{AC}(t)$, i.e., by correcting the original coarse navigation profile with the estimated navigation profile error. Similarly, improved image block phase error profiles may be formed as $\epsilon \psi_{i,j}(t) - \epsilon \theta_{i,j}(t)$ for i=1, ..., I, and j=1, ..., J, respectively.

The phase error profiles obtained from autofocus are in general distorted by noise in the SAR image pixels. For image blocks with a large number of small bright discrete targets, the phase error has the least distortion. However, image blocks without discrete targets lead to very poor phase error profiles. The quality of the phase error profiles generated by the autofocus algorithm is determined by the discrete targets in each image block. It is proportional to the number, sharpness, and brightness of the discrete targets. A convenient measure of the quality of the phase error profile is the contrast of the processed image block.

In one embodiment, the weighting coefficients $W_{i,j}$ to be used in calculating the summed norm of the phase error, and in extracting the navigation error profile, are obtained in two steps. In an embodiment with, for example, 16 image blocks, and in which a total of 7 polynomial coefficients are being determined, the number of image blocks exceeds the number of degrees of freedom in the navigation error, and a fraction of the image blocks with lower image contrast may be ignored, i.e., assigned weights of zero. The number of image blocks assigned nonzero weights must be greater than the number of degrees of freedom in the navigation error and, to avoid performing more computations than necessary, may preferably be less than 30% of the total number of image blocks. Once the image blocks to be ignored have been identified, the contrast for each of the remaining image blocks may be converted into weights using the formula $$W_{i,j} = \frac{\gamma_{i,j}}{\gamma 0_{i,j}} \cdot \frac{1}{\gamma 0_{i,j}^{1/2}}$$

where $W_{i,j}$ is again the weight for the phase error of the $(i,j)^{th}$ image block, $\gamma 0_{i,j}$ is the image contrast before autofocus, and $\gamma_{i,j}$ is the image contrast after autofocus. This weight is thus based on the magnitude of the normalized contrast improvement, where contrast is defined in the customary manner, as $$\sum_i A_i^4 / \left( \sum_i A_i^2 \right)^2$$

where $A_i$ is the magnitude of the $i^{th}$ image pixel.

Figure 3:
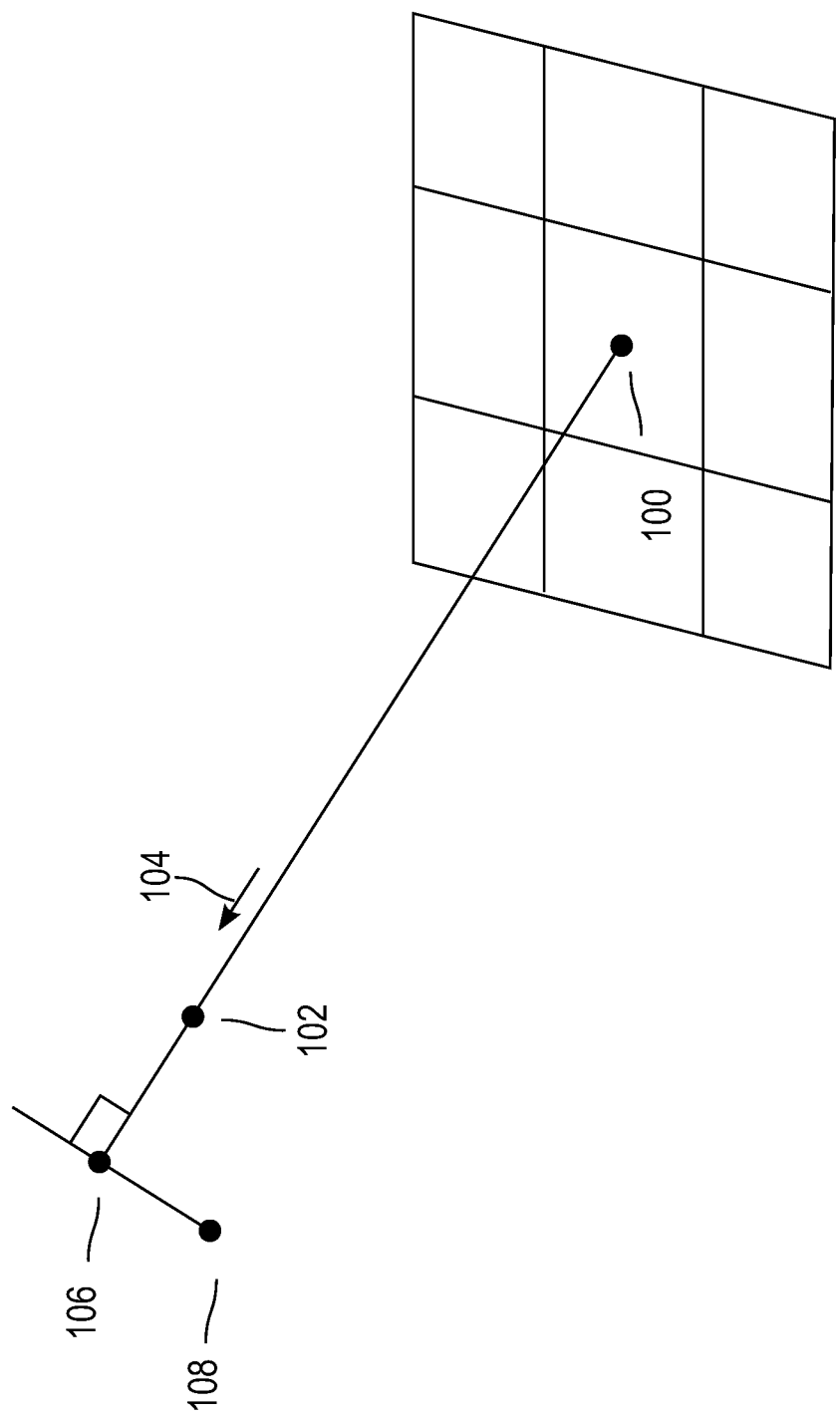
FIG. 3 is a diagram illustrating the geometry of an aircraft's true and estimated position at one point in time according to an embodiment of the present invention.

In another embodiment, the navigation error profile, and, as a result, an improved navigation profile, may be obtained one point at a time using a least squares fit. Referring to FIG. 3, the phase error profile $\epsilon \psi_{i,j}(t)$ of image block (i,j) is proportional to the error $\Delta R_{i,j}(t)$ in the slant range between $\vec{P}_{IM}(i, j)$, the center 100 of image block (i,j), and the knowledge aircraft position 102, i.e.

$$\Delta R_{i,j}(t) = \frac{\lambda}{4\pi} \epsilon \psi_{i,j}(t).$$

This implies that the true distance from the actual aircraft position to the center 100 of image block (i,j) differs from the knowledge distance by $\Delta R_{i,j}(t)$. Hence, the true distance is given by $\|\vec{R}_{AC}(t) - \vec{P}_{IM}(i,j)\| + \Delta R_{i,j}(t)$, where $\vec{R}_{AC}(t)$ is again the knowledge aircraft position.

If the phase error is known at any time then one may conclude that at that time the aircraft position lies on a sphere centered at $\vec{P}_{IM}(i, j)$ with a radius $\|\vec{R}_{AC}(t) - \vec{P}_{IM}(i,j)\| + \Delta R_{i,j}(t)$. Since the navigation error is usually quite small, one can approximate the small portion of the sphere with a tangent plane, and assume that the aircraft position lies on a plane perpendicular to the vector $\vec{R}_{AC}(t) - \vec{P}_{IM}(i,j)$.

Let $\hat{p}_{i,j}(t)$ be the unit vector 104 from the center 100 of image block (i,j) to the knowledge aircraft position 102 at time t. Let $\overline{RI}_{i,j}(t)$ be the intersection 106 of the above mentioned plane and the line passing through $\vec{R}_{AC}(t)$ and $\vec{P}_{IM}(i, j)$ and let the aircraft position estimate 108 be $\vec{\tilde{R}}_{AC}(t)$. Since only a subset of the phase error profiles are needed to form an improved navigation profile, we may use, instead of the image block index (i,j), the single index k, where k= 1, 2, ..., N. If the phase error profiles generated by the autofocus algorithm were error-free, then the aircraft position estimate would satisfy the following overdetermined system of equations:

$$\left( \vec{\tilde{R}}_{AC}(t) - \overline{RI}_1(t) \right) \bullet \hat{p}_1(t) = 0,$$

where · is the inner product operator, $$\left( \vec{\tilde{R}}_{AC}(t) - \overline{RI}_2(t) \right) \bullet \hat{p}_2(t) = 0$$

...

...

$$\left( \vec{\tilde{R}}_{AC}(t) - \overline{RI}_N(t) \right) \bullet \hat{p}_N(t) = 0$$

The phase error profiles generated by the autofocus algorithm will not be perfectly free of errors; in this case a solution which most nearly satisfies, in a least-squares sense, all of the equations in this overdetermined system of equations can be obtained by a weighted least squares method. Let the distance from the aircraft position estimate to the plane normal to $\hat{p}_1(t)$ and containing $\overline{RI}_1(t)$ be $d_1$. It can be shown that $$d_1 = \|(\vec{\tilde{R}}_{AC}(t) - \overline{RI}_1(t)) \cdot \hat{p}_1(t)\|.$$

The weighted sum of these distances $d_1$ through $d_N$ is then given by $$d = \Sum_{k=1}^{N} W_k \| (\vec{\overline{R}}_{AC}(t) - \overline{RI}_k(t)) \cdot \hat{p}_k(t) \|$$

Minimizing d is equivalent to minimizing $$\Sum_{k=1}^{N} W_k \| (\vec{\overline{R}}_{AC}(t) - \overline{RI}_k(t)) \cdot \hat{p}_k(t) \|^2.$$

$\vec{\overline{R}}_{AC}(t)$ may then be found as the solution of the following matrix equation, which minimizes this error in a weighted least-squares sense:

$$\begin{bmatrix} \sum_{k=1}^{N} W_k \hat{x}_k(t)\hat{x}_k(t) & \sum_{k=1}^{N} W_k \hat{x}_k(t)\hat{y}_k(t) & \sum_{k=1}^{N} W_k \hat{x}_k(t)\hat{z}_k(t) \\ \sum_{k=1}^{N} W_k \hat{y}_k(t)\hat{x}_k(t) & \sum_{k=1}^{N} W_k \hat{y}_k(t)\hat{y}_k(t) & \sum_{k=1}^{N} W_k \hat{y}_k(t)\hat{z}_k(t) \\ \sum_{k=1}^{N} W_k \hat{z}_k(t)\hat{x}_k(t) & \sum_{k=1}^{N} W_k \hat{z}_k(t)\hat{y}_k(t) & \sum_{k=1}^{N} W_k \hat{z}_k(t)\hat{z}_k(t) \end{bmatrix} \begin{bmatrix} \vec{x}_{AC}(t) \\ \vec{y}_{AC}(t) \\ \vec{z}_{AC}(t) \end{bmatrix} =$$

$$\begin{bmatrix} \sum_{k=1}^{N} W_k (\overline{RI}_k(t) \bullet \hat{p}_k(t)) \hat{x}_k(t) \\ \sum_{k=1}^{N} W_k (\overline{RI}_k(t) \bullet \hat{p}_k(t)) \hat{y}_k(t) \\ \sum_{k=1}^{N} W_k (\overline{RI}_k(t) \bullet \hat{p}_k(t)) \hat{z}_k(t) \end{bmatrix}$$

where $\begin{bmatrix} \hat{x}_k(t) \\ \hat{y}_k(t) \\ \hat{z}_k(t) \end{bmatrix} = \hat{p}_k(t)$ and $\begin{bmatrix} \vec{x}_{AC}(t) \\ \vec{y}_{AC}(t) \\ \vec{z}_{AC}(t) \end{bmatrix} = \vec{\overline{R}}_{AC}(t)$.

The improved navigation profile $\vec{\overline{R}}_{AC}(t)$ may then be used to generate an improved SAR image.

Directly incorporating the navigation improvement process into the SAR signal processing flow would be computationally inefficient because SAR image formation would have to be performed twice: once to generate autofocus phase error profiles for the image blocks, and once to generate an improved, well focused image using the improved navigation profile. This inefficiency may be significantly reduced by redesigning the overall SAR signal processing flow.

The efficiency may be enhanced by reducing the processing times involved in the first image formation and in the autofocus process. In the navigation profile improvement process, the number of phase error profiles need not be large: between four and six phase error profiles should be sufficient. This means that we need only process four to six image blocks in the first image formation process. However, the whole image must be processed to determine which image blocks will provide high quality phase error profiles. This may be accomplished efficiently by forming the first SAR image using a backprojection algorithm with a lower image pixel sampling rate. Reducing the sampling rate by a factor of 2 or 3 in each dimension may reduce the image formation time to 25% or 11%, respectively, compared to the time required at full sampling rate, but the image generated using a reduced sampling rate is adequate for an indication of local image contrast. Once the few image blocks with good contrast are identified based on the calculated contrast measures, autofocus is applied to generate the phase error profiles. Using this approach, the overall computational efficiency of SAR signal processing, according to embodiments of the present invention, can be increased significantly.

Figure 4:
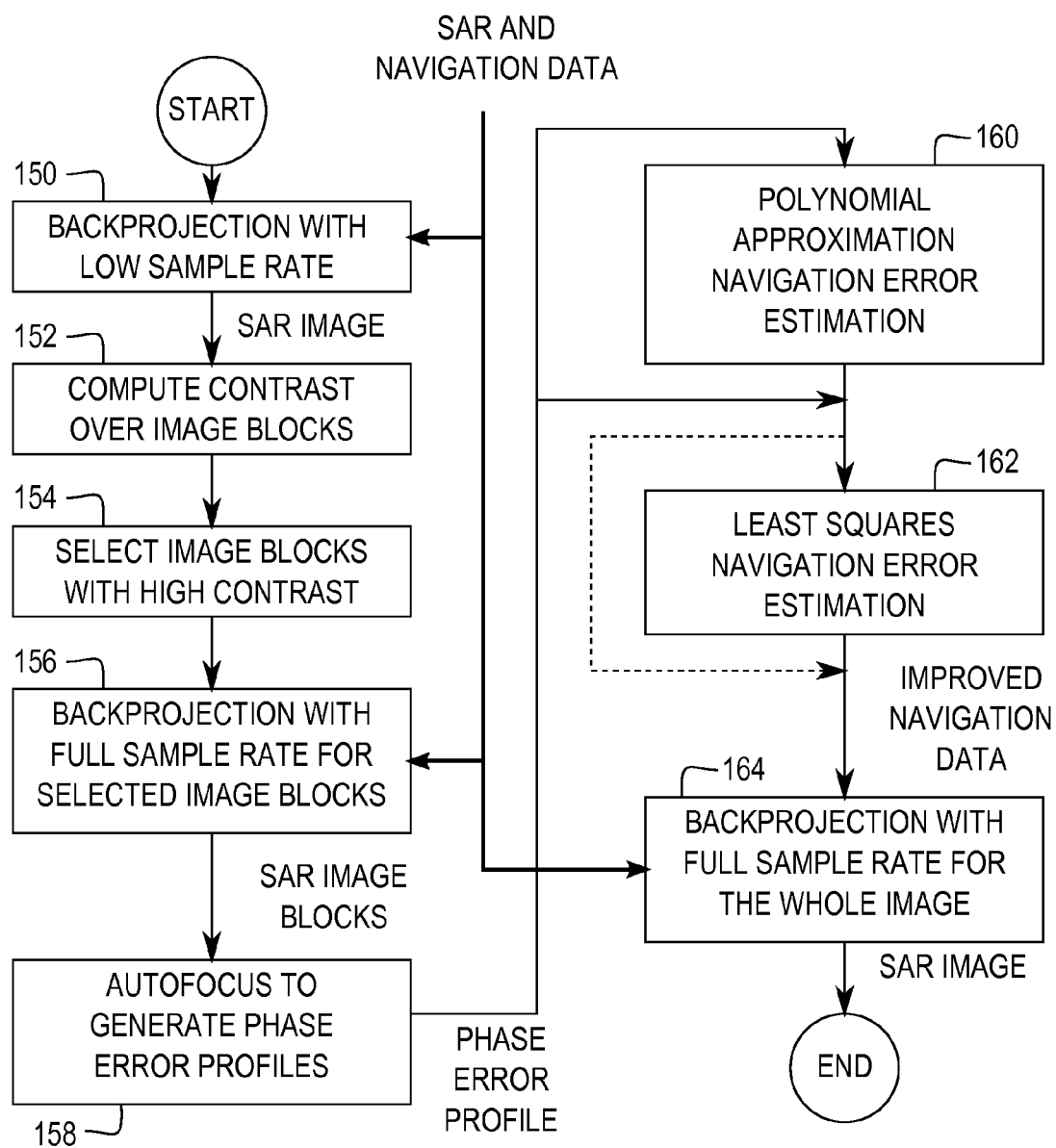
FIG. 4 is a flowchart and data flow diagram, showing an improved SAR signal processing flow according to an embodiment of the present invention.

In particular, referring to FIG. 4, in a first step 150 of an exemplary embodiment, an initial backprojection may be performed with a reduced sample rate, to generate a SAR image. Because of the reduced sample rate, this backprojection step 150 may incur considerably less computational load and delay than a backprojection at full resolution. In a subsequent step 152, the contrast is computed over all of the image blocks in the image, and then, in step 154, image blocks with adequate contrast to be used in the following steps are identified and selected. A backprojection is then performed, in step 156, with full sample rate, for these selected image blocks. In step 156, the backprojection again incurs a reduced computational burden, in this case as a result of being performed over only a subset of the image blocks. Next, in step 158, an autofocus algorithm is used to generate a phase error profile for each image block.

As indicated by the dashed line bypassing step 160, step 160 is optional. In step 160, if it is performed, a polynomial approximation for the navigation error profile is used to find an improved navigation solution. As indicated by the dashed line bypassing step 162, this step also is optional. In step 162, if it is performed, a least squares method is used to find the navigation path which is the best fit, in a weighted least square sense, to the phase and range errors corresponding to each of the image blocks selected in step 154. If both steps 160 and 162 are performed, then the intermediate navigation profile and the intermediate image block phase error profiles resulting from step 160 are fed into step 162. Once an improved navigation solution has been found by one or both of steps 160 and 162, backprojection with full sample rate over the entire image is used, in step 164, to obtain the final SAR image. In one embodiment, the final SAR image is then displayed on a display.

Although limited embodiments of a wide beam SAR focusing method using a navigation solution derived from autofocus data have been specifically described and illustrated herein, many modifications and variations will be apparent to those skilled in the art. For example, in finding an estimated navigation error profile using a polynomial approximation, it may be preferred to use more or fewer than the 7 coefficients of the exemplary embodiment disclosed here, and the orders of the polynomials in which these coefficients appear may be different from those disclosed herein. Accordingly, it is to be understood that the wide beam SAR focusing method using a navigation solution derived from autofocus data employed according to principles of this invention may be embodied other than as specifically described herein. The invention is also defined in the following claims and equivalents thereof.

What is claimed is:

1. A method for forming a synthetic aperture radar (SAR) image, from SAR data and a navigation profile, the method comprising:
   generating a first SAR image from the SAR data and the navigation profile;
   dividing the SAR image into image blocks;
   selecting a subset of the image blocks;
   applying an autofocus algorithm to each of the selected image blocks to form phase error profile estimates for the selected image blocks;
   generating a navigation error profile estimate from the phase error profile estimates; and generating a second SAR image from the SAR data, the navigation profile, and the navigation error profile estimate, displaying the second SAR image on a display.

2. The method of claim 1, wherein the generating a navigation error profile estimate comprises:

approximating the navigation error profile estimate as a vector of three low-order polynomials in time and searching the space of polynomial coefficient values for a set of values which optimizes a measure of performance for the navigation error profile estimate.

3. The method of claim 2, wherein the measure of performance is the weighted summed norm of the phase error, taken over a set of selected image blocks.

4. The method of claim 3, wherein an image block is selected on the basis of having image contrast exceeding a predetermined threshold.

5. The method of claim 3, wherein the weight, for a selected image block, used in calculating the weighted summed norm of the phase error, equals (i) the reciprocal of the square root of the image contrast before autofocus for that image block, multiplied by (ii) the ratio of (a) the image contrast before autofocus for that image block to (b) the image contrast after autofocus for that image block.

6. The method of claim 1, wherein the generating a navigation error profile estimate comprises:

selecting a set of image blocks; and finding, for each point in time, the point in space which minimizes the weighted sum of the squares of the differences between the phase errors for the selected image blocks calculated from the navigation error profile, and the phase errors for the selected image blocks resulting from the autofocus algorithm.

7. The method of claim 6, wherein the selected image blocks are selected on the basis of having image contrast exceeding a predetermined threshold.

8. The method of claim 6, wherein the weight, for a selected image block, used in calculating the weighted sum, is a function of the image contrast before autofocus for that image block and the image contrast after autofocus for that image block.

9. The method of claim 6, wherein the weight, for a selected image block, used in calculating the weighted sum, equals (i) the reciprocal of the square root of the image contrast before autofocus for that image block, multiplied by (ii) the ratio of (a) the image contrast before autofocus for that image block to (b) the image contrast after autofocus for that image block.

10. The method of claim 1, wherein the generating a navigation error profile estimate comprises:

writing an intermediate navigation error profile estimate as a vector of three low-order polynomials in time;

searching the space of polynomial coefficient values for a set of values which optimizes a measure of performance for the intermediate navigation error profile estimate;

forming an intermediate navigation profile and an intermediate image block phase error profile using the set of values of the polynomial coefficients;

selecting a set of image blocks; and using the intermediate navigation profile and the intermediate image block phase error profile to find, for each point in time, the point in space which minimizes the weighted sum of the squares of the differences between the phase errors for the selected image blocks calculated from the point in space, and the phase errors for the selected image blocks resulting from the autofocus algorithm.

* * * * *